Aug. 25, 1942.  E. I. ANDERSON  2,294,065
VACUUM TUBE VOLTMETER CIRCUIT
Filed Nov. 2, 1939
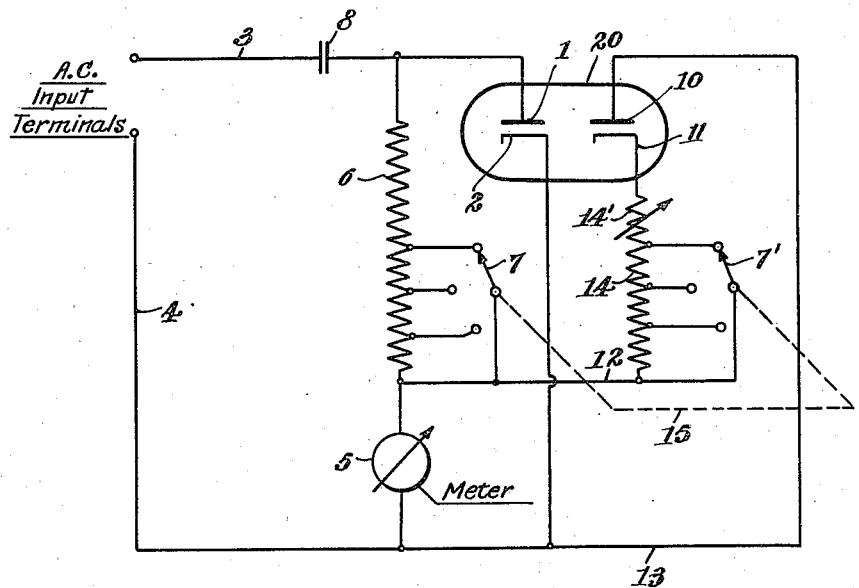
INVENTOR:
Earl I. Anderson,
by
H. S. Swien
ATTORNEY.

Patented Aug. 25, 1942

2,294,065

UNITED STATES PATENT OFFICE 2,294,065

VACUUM TUBE VOLTMETER CIRCUIT

Earl I. Anderson, Bayside, N. Y., assignor to Radio Corporation of America, a corporation of Delaware Application November 2, 1939, Serial No. 302,483

2 Claims. (Cl. 171—95)

My present invention relates to vacuum tube voltmeter circuits adapted for measuring alternating current voltages, and more particularly to an improved voltmeter adapted for measuring alternating current voltages of relatively small magnitudes.

One of the main objects of my present invention is to provide an alternating current vacuum tube voltmeter of the diode rectifier type, wherein an electronic device is utilized for substantially eliminating the effect of contact potential of the rectifier diode.

Another important object of this invention is to provide in operative association with the rectifier diode of an alternating current vacuum tube voltmeter, a second diode which functions to balance out the effect of the contact potential of the voltmeter diode.

Still another object of this invention is to provide an alternating current voltmeter of the type including a diode rectifier, a load resistor and a meter device, a second diode being arranged in bucking relation to the voltmeter diode thereby to eliminate any indication in the meter device which arises by virtue of the contact potential of the voltmeter diode.

And still other objects of this invention are to improve generally the efficiency and reliability of alternating current vacuum tube voltmeters, and more especially to provide an alternating current voltmeter of the diode rectifier type which is not only efficient and reliable in operation, but is economically manufactured and assembled.

The novel features which I believe to be characteristic of my invention are set forth in particularity in the appended claims; the invention itself, however, as to both its organization and method of operation, will best be understood by reference to the following description taken in connection with the drawing in which I have indicated diagrammatically a circuit organization whereby my invention may be carried into effect.

Referring now to the accompanying drawing, there is shown a vacuum tube voltmeter of well known and conventional type. Such a voltmeter usually comprises an electron discharge device functioning as a rectifier, a load resistor and a voltage indicating meter. An electron discharge device of the diode type is commonly employed at the present time, because the diode device provides diode rectification of the alternating currents impressed upon the input terminals of the voltmeter. There are many advantages secured when utilizing diode rectification. Among these advantages is the very important one of having linear relation between input and output voltages, and hence the elimination of the need for calibration of the instrument. The numeral 1 denotes the anode of the voltmeter diode, and the numeral 2 designates the cathode which may be of the indirectly heated type. The anode 1 is connected by condenser 8 and lead 3 to one of the alternating current input terminals, while the opposite input terminal is connected to the cathode 2 through lead 4. The direct current return path is through the resistor 6 and the meter 5.

The meter 5 may be of any well known type, and is schematically represented since those skilled in the art are fully acquainted with the construction of meters commonly employed in vacuum tube voltmeters. The resistor 6 may be provided with a plurality of spaced taps along the length thereof so as to provide a multi-range instrument. In such case an adjustable contact arm 7 is provided so that the resistor may be adjusted in magnitude depending on the voltage range desired to be indicated.

The diode 1—2 in the absence of alternating current input to the instrument possesses a small current flow which is due to a phenomenon known as "contact potential." Briefly, contact potential arises by virtue of the initial speed of the electrons leaving the heated cathode 2, and being collected by the cold electrode 1. Although the current flow caused by contact potential is relatively small, yet if the value of resistance 6 employed is small, or the range of the meter is low, the current flow due to contact potential can be very large compared with that resulting from the alternating current voltage to be measured. In other words, if there is impressed upon the input terminals of the voltmeter an alternating current voltage which is of the order of magnitude of the voltage developed across resistor 6 by the current due to the contact potential, then the range of the voltmeter device will be proportionately reduced.

In other words, when reading the scale of the meter 5 an allowance would have to be made for an initial indication due to the current flow caused by contact potential of the diode. It has been attempted in the past to counteract the effect of current flow due to contact potential by using a small battery in bucking relation to the contact potential current. However, such an expedient is not reliable since the battery degenerates appreciably in a very short time, and the user of the voltmeter must be continually checking the meter. It is essential to provide a means for substantially eliminating the effect of the current due to contact potential without the voltmeter user having to concern himself about the compensating device for long periods of time.

In my present invention this long-range compensating effect is provided in a simple and reliable manner by connecting across the meter 5 a second electron discharge device. Specifically the latter is a diode which comprises the anode 10 and the indirectly heated cathode 11. Cathode 11 is connected to the junction of meter 5 and resistor 6 through a path which includes the resistor 14 and lead 12. The anode 10 of the second diode is connected by lead 13 to the low potential end of meter 5. The fixed end of adjustable arm 7 is connected to lead 12. The load resistor 14, if the voltmeter is of the variable range type, is provided with taps similar to the taps located on resistor 6, and the adjustable switch arm 7' is provided for connecting the same magnitude of resistance in circuit with diode 10—11 as is connected in circuit with diode 1—2.

The fixed end of switch 7' is connected to lead 12. The dotted line 15 indicates a mechanical control coupling between switch arms 7 and 7' so that the resistance values of resistors 6 and 14 may be kept the same in order to maintain the two direct currents due to the contact potentials of both diodes of the same magnitude. Since diode 10—11 is connected in opposed relation to diode 1—2 across meter 5, it will be clear that there will be no flow of direct current through meter 5 due to the contact potentials of both diodes. If desired the section 14' of resistor 14 may be made independently adjustable so that the direct currents, due to the contact potentials of both diodes, may be kept exactly equal in value should the contact potential of diode 10—11 vary somewhat due to aging, or due to its initial variation caused by manufacture.

It will then be seen that according to my invention the contact potential of diode 10—11 is utilized to generate a direct current through resistor 14 which flows through meter 5 in polarity opposition to the direct current resulting from voltage developed across resistor 6 because of the contact potential of diode 1—2. The two diodes may be independent of each other, but preferably they are mounted within a common tube envelope 20, and the tube employed may be of the 6H6 type. In this way the range of meter proportionality is increased since the only indications appearing on the scale on meter 5 will be those due to the alternating current voltage impressed upon the input terminals of the voltmeter. Actual experience with a compensating voltmeter of the type disclosed herein shows that complete compensation is had for periods as long as two years. The meter 5, in an actual experiment, was 200 microamperes, full scale, while resistor 6 was a 10,000 ohm resistor and resistor 14 was variable from 5000 to 15,000 ohms. If both halves of a 6H6 type tube are used for this purpose then there is no reason why the compensation should not be effective for as long as the life of the tube itself. The present compensation arrangement is particularly advantageous for measuring alternating current voltages over a range of values which would be substantially affected by the contact potential value of a conventional diode which may be from ½ to 1 volt.

While I have indicated and described a system for carrying my invention into effect, it will be apparent to one skilled in the art that my invention is by no means limited to the particular organization shown and described, but that many modifications may be made without departing from the scope of my invention, as set forth in the appended claims.

What I claim is:

1. In combination with an alternating current voltmeter circuit of the type including a diode rectifier having a pair of alternating voltage input terminals, impedance means in circuit with said diode for developing direct current voltage from rectified alternating voltage, and a visual voltage indicator in circuit with said voltage developing impedance means, an arrangement for balancing out the effect of direct current voltage developed across said developing means by the direct current due to the diode contact potential comprising a second diode having its electrodes connected across said visual voltage indicator, an impedance in circuit with solely said second diode and indicator for developing the direct current voltage from the direct current flow in the circuit of the second diode due to contact potential thereof, and said second direct current voltage being applied to said voltage indicator in polarity opposition to the voltage derived from the first diode contact potential said indicator being connected between the junction of said impedance and said impedance means and one of said terminals.

2. In combination with an alternating current voltmeter circuit of the type including a diode rectifier having a pair of alternating voltage input terminals, resistor means in circuit with said diode for developing direct current voltage from rectified alternating voltage, and a visual voltage indicator in circuit with said voltage developing means, an arrangement for balancing out the effect of direct current voltage developed across said resistor means by the direct current due to the diode contact potential comprising a second diode having its electrodes connected across said visual voltage indicator, an impedance in circuit with solely said second diode and indicator for developing the direct current voltage from the direct current flow in the circuit of the second diode due to contact potential thereof, and said second direct current voltage being applied to said voltage indicator in polarity opposition to the voltage derived from the first diode contact potential, said indicator being connected between the junction of said resistor and impedance and one of said terminals, a single tube envelope housing the electrodes of both said diodes, and means for adjusting the resistor and impedance of both diode circuits so that the resistive magnitudes in both circuits are the same.

EARL I. ANDERSON.